United States Patent [19]

Banfield

[11] Patent Number: 4,637,197
[45] Date of Patent: Jan. 20, 1987

[54] METHOD AND COMPOSITIONS FOR REMOVAL OF MOISTURE

[75] Inventor: Charles E. Banfield, Nashua, N.H.

[73] Assignee: Epoxy Technology, Inc., Billerica, Mass.

[21] Appl. No.: 814,572

[22] Filed: Dec. 26, 1985

Related U.S. Application Data

[63] Continuation of Ser. No. 660,750, Oct. 15, 1984.

[51] Int. Cl.[4] ............................................. B65B 55/00
[52] U.S. Cl. ........................................ 53/428; 53/431; 53/474; 252/194; 523/455; 525/507; 528/112; 528/115; 528/565
[58] Field of Search ............... 528/112, 115, 365; 523/455; 525/507; 53/428, 131, 474; 252/194

[56] References Cited

U.S. PATENT DOCUMENTS

| | | | |
|---|---|---|---|
| 2,965,607 | 4/1956 | Martin et al. | 528/112 |
| 3,062,770 | 3/1960 | Hirsch et al. | 523/454 |
| 3,083,186 | 3/1963 | McGary, Jr. et al. | 528/365 X |
| 3,112,289 | 11/1963 | Stocker | 523/455 |
| 3,211,503 | 10/1965 | Barnes | 206/328 X |
| 3,446,756 | 5/1969 | Ramos | 523/455 X |
| 3,468,824 | 9/1969 | Williams | 523/455 X |
| 3,635,869 | 3/1970 | Steele et al. | 523/456 |
| 3,647,726 | 3/1972 | Ulmer | 523/455 X |
| 3,704,806 | 12/1972 | Plachenov et al. | 252/194 X |
| 3,723,473 | 3/1973 | Schmerling | 523/455 X |
| 4,081,397 | 3/1978 | Booe | 252/194 |
| 4,120,813 | 10/1978 | Hatanaka et al. | 252/194 |
| 4,132,697 | 6/1976 | Barie et al. | 523/456 |
| 4,273,914 | 6/1981 | Smith et al. | 252/182 X |
| 4,398,013 | 10/1981 | Johnson | 522/31 |
| 4,451,637 | 5/1984 | Yamato et al. | 252/182 X |

OTHER PUBLICATIONS

CA 97:39843 "Water Absorbent Polymers" (1982) p. 33.
CA 91:92334 "NMR Study of Water Absorbed by Epoxy Resin" (1979) p. 27.
CA 91:21596 "The Glass Transition . . . " (1979) p. 34.
CA 89:172602 "Moisture-Absorbing Agent for Semiconductor Devices" (1978) p. 615.
CA 80:138489 "Moisture Absorber" (1974) p. 366.
Stecher et al., (Eds.) *The Merck Index*, 8th Ed. (1968) Merck & Co., Inc. p. 6.

Primary Examiner—Edward A. Miller
Assistant Examiner—Matthew A. Thexton
Attorney, Agent, or Firm—Lahive & Cockfield

[57] ABSTRACT

Methods and compositions are disclosed for absorbing moisture when moisture constraints are present. The moisture absorbing compositions include a curable epoxy resin, a curing agent, and an anhydride of a carboxylic acid. In one embodiment, the anhydride component is present in an amount sufficient both to cure the resin and to absorb the moisture. In other embodiments, a separate curing agent is included. Methods employing such compositions as adhesives or coatings, particularly in electronic device packaging, also are disclosed.

22 Claims, No Drawings

METHOD AND COMPOSITIONS FOR REMOVAL OF MOISTURE

This application is a continuation of application Ser. No. 660,750, filed Oct. 15, 1984.

BACKGROUND OF THE INVENTION

The technical field of this invention concerns methods and compositions for removing moisture through chemical reaction and, in particular, the removal of moisture from environments containing epoxy adhesives.

Entrapped moisture is a major concern in many industrial and commercial products because of the damaging effects it can have on operating systems or delicate components. For example, manufacturers of electronic parts and packages often must take expensive and time-consuming steps to hermetically seal moisture out of their products. High temperatures and vacuums or dry nitrogen atmospheres are often employed to remove moisture prior to the sealing of electronic packages. Eutectic bonds are used rather than polymeric adhesives within the sealed packages to avoid the reintroduction of moisture. The acceptable moisture level for many electronic devices can be as low as 5,000 or even 2,000 parts per million (ppm). However, even when hermetic sealing steps are taken, it is often difficult to maintain these standards.

Eutectic bonding typically involves the use of a two phase, e.g., gold and silicon, conductive solder to join an electronic chip, die or other component to its packaging in a moisture-free fashion. The materials that form eutectic solders are expensive and the bond coverage they provide is often less than the full area on which the chip or die component overlies its substrate. This disparity in coverage is a source for stress development that can distort and damage the circuitry. Moreover, the high temperature necessary to induce eutectic bonding, i.e., 400° C. to 500° C., imposes restrictions on component selection and adds to the processing time and costs.

Until now epoxy adhesives have not been considered suitable for use within sealed electronic packages where moisture constraints are present. A reason is that the epoxy compositions themselves often contain moisture which is expelled into the sealed package during the life of the component. Moisture constraints are particularly troublesome for epoxy-containing packages when the finished product is exposed to elevated temperatures, i.e., 150° C. to 250° C., for extended periods of time.

There accordingly exists a need for better methods and compositions for maintaining substantially moisture-free environments for industrial and commercial products, particularly electronic packages. Adhesives that are inexpensive, provide high adhesive coverage and do not release moisture would satisfy a long-felt need in industry, particularly if they could be applied at lower temperatures than eutectic solders and maintain package moisture levels below 5000 ppm.

SUMMARY OF THE INVENTION

It has been discovered that moisture-absorbing adhesives can be formed by the addition of carboxylic acid anhydrides to epoxy compositions. Accordingly, adhesives pursuant to the invention, suitable for sealing components within electronic packages and the like, include a curable epoxy resin and a carboxylic acid anhydride in an amount greater than necessary for curing the resin. The excess anhydride reacts with unwanted moisture. In one embodiment, a separate curing agent is used to achieve resin curing, while the anhydride absorbs moisture from the finished product. In another embodiment, the anhydride component is present in an amount sufficient both to cure the resin and to absorb moisture.

Anhydrides useful in the present invention are formed by the condensation of carboxylic acid molecules and the consequent elimination of water. The linkage of the carboxylic groups in an anhydride is relatively weak and the anhydride readily separates into the more stable acid molecules in the presence of moisture. Hence, the anhydride component in the present epoxy composition, which is not exhausted in initial resin curing, serves as a moisture absorber in the finished composition. Additionally, the carboxylic acid which forms from the anhydride, when moisture is absorbed, can further react with any remaining resin that has not been cross-linked or cured and, thereby, prevent the absorbed moisture from being released again if the acid-anhydride equilibrium conditions change.

Suitable anhydrides for practice of this invention include anhydrides of aliphatic, carbocyclic and heterocyclic carboxylic acids and substitute derivatives thereof. Suitable anhydrides include the anhydrides of monocarboxylic acids and anhydrides of polycarboxylic molecules containing more than one carboxyl (—COOH) group.

Examples of aliphatic anhydrides for practice of the invention include, without limitation, anhydrides of formic, acetic, propionic, butyric, valeric and other aliphatic carboxylic acids. Examples of carbocyclic anhydrides include, without limitation, anhydrides of benzoic, phthalic (including tetra and hexahydro structures) and mellitic acids. Examples of heterocyclic anhydrides, without limitation, include furoic acid. Polycarboxylic acid anhydrides include, without limitation, anhydrides of maleic, succinic, nadic and trimellitic acids. Substituted derivatives include, without limitation, chloro, methyl and cyano-derivatives, such as anhydrides of methyl tetrahydrophthalic, tetrachlorophthalic and methyl nadic acids.

The curable epoxy resins which can be used in the practice of this invention include any of those materials currently available in the art. Typical epoxy resins suitable for the practice of the present invention are disclosed in U.S. Pat. Nos. 2,324,483; 2,500,600; and 2,965,607, the disclosures of which are expressly incorporated herein by reference. The more common types of epoxy resins are the reaction products of epichlorhydrin and 2,2-di(p-hydroxyphenyl)propane (Bisphenol A), the glycidyl ethers of mononuclear di- and trihydroxy phenols (resorcinol, hydroquinone, pyrocatechol, saligenin and phologlucinol), the glycidyl ethers of other polyhydroxy phenols (Bisphenol F, trihydroxyldiphenyl dimethyl methane, 4,4'-dihydroxy biphenyl, tetracis(hydroxyphenyl)ethane, long-chain bisphenols, dihydroxy diphenyl sulfone, and Novolacs), the glycidyl ethers of polyalcohols (ethylene glycol, 1,4-butanediol, glycerol, erythritol, and polyglycols), and the epoxylated cyclic and straight chain olefins (vinyl cyclohexene, dicyclohexene carboxylate, and polybutadienes).

These and many other epoxy resins are available commercially, for example, under the trade names "Epon Resins" from the Shell Chemicals Company, "Araldrite Resins" from the Ciba-Geigy Company, "DER and DEN Resins" from the Dow Chemical Company and "Unox Epoxides" from Union Carbide Chemicals Company.

In certain embodiments of the invention, it is preferred to employ a curing agent to induce the epoxidation reaction independently without exhausting the moisture absorbing anhydride component in curing the resin. Suitable independent curing agents include primary and secondary aliphatic polyamines; metal halides, such as aluminum chloride, zinc chloride, ferric chloride, and boron trifluoride as well as complexes of metal halides with ethers, amines, acid anhydrides, or ketones; diazonium salts; phosphoric acid and partial esters thereof including n-butyl orthophosphate, diethyl orthophosphate and hexaethyl tetraphosphate; amino compounds, such as triethylamine, ethylene diamine, diethylamine, dietylene triamine, triethylene tetraamine, dicyandiamide, melamine, and salts of inorganic acids, such as zinc fluroborate, potassium persulfate, nickel fluroborate, and magnesium perchlorate. One particularly useful independent curing agent is boron trifluoride monoethylamine ($BF_3MEA$).

The moisture-gettering anhydride component can be compounded with the curing agent and other epoxidation catalysts into a hardener and used in the same fashion as conventional hardeners. The hardener and resin are packaged separately (i.e. as a kit) and mixed just prior to use. These same resins and hardeners can also be chilled or frozen. Preferably the anhydride will form 15-75 percent by weight of the hardener and most preferably about 40-60 percent.

Alternatively, the same moisture-gettering anhydride may serve both to cure the resin and, in excess quantity, to absorb moisture from the epoxy-sealed article during use. Examples of anhydrides that can serve both as a curing agent (hardener) and as a moisture absorber include, without limitation, phthalic, mellitic and diaryl acid anhydrides generally and methyl tetrahydrophthalic acid anhydride, in particular.

The invention will next be described in connection with certain preferred embodiments. However, it should be clear that various changes and modifications can be made without departing from the spirit or scope of the invention. For example, although silver is used as a conductive filler in the following examples, other conductive materials such as gold, copper, palladium, carbon, graphite, nickel, or platinum can also be used. Moreover, other fillers, such as aluminum oxide ($Al_2O_3$), can be added to the epoxy compositions of the present invention to form epoxy adhesives with dielectric properties and where electrical or thermal conductive properties are not important to the user, fillers can be omitted entirely. Additionally, various solvents may be employed as carriers for either the hardener or the resin component of the present invention, as desired.

While the materials of the present invention are particularly useful as adhesives, it should also be apparent that they may be used as coatings or otherwise generally disposed in environments where moisture control is warranted.

DESCRIPTION OF THE PREFERRED EMBODIMENTS

The following non-limiting examples illustrate specific practices of the invention:

EXAMPLES

A series of moisture-absorbing epoxy compositions was prepared and used as adhesives. In each instance, a bisphenol epoxy resin (a diglycidyl ether of bisphenol A having an equivalent weight of about 170 to about 200) was used as the curable epoxy resin. Various carboxylic acid anhydrides were employed in the epoxy compositions as moisture absorbers. In Examples I and II an acetic acid anhydride was used as the moisture absorber. The composition of Example III employed proprionic acid anhydride and in Example IV butyric acid was used. Methyl tetrahydrophthalic acid (MTHPA) anhydride served as the moisture absorbing anhydride in Example V.

In each of the examples, except Example V, boron trifluoride monoethylamine ($BF_3MEA$) was used as the curing agent. In Example V, The MTHPA anhydride served both as the curing agent and, in excess amounts, as the moisture absorber. Examples II-V also included a conductive filler of silver flakes.

The adhesives were used to bond various materials together and were heat cured by prebaking at 120° C. for one-half hour and further baking at 180° C. for at least an additional one-half hour. Adhesive bonds were obtained in each instance having excellent integrity and capable of absorbing moisture from the surrounding environment. Table I below summarizes the various components and proportions (in parts by weight) of each of the exemplary compositions.

TABLE I

MOISTURE ABSORBING EPOXY COMPOSITIONS

| | | Composition: Parts by Weight | | | |
|---|---|---|---|---|---|
| Example | Type of Anhydride | Resin | $BF_3MEA$ | Anhydride | Filler |
| I | Acetic Acid | 100 | 3 | 6.6 | — |
| II | Acetic Acid | 100 | 3 | 6.6 | 262 |
| III | Propionic Acid | 100 | 3 | 8.4 | 262 |
| IV | Butyric Acid | 100 | 3 | 10.3 | 262 |
| V | MTHPA | 100 | 3 | 10.9 | 262 |

The acetic acid anhydride composition of Example II was further tested in a hermetically sealed "header" package process. Semiconductor circuit dice were bonded into the packages with the conductive moisture absorbing epoxy using two alternative cure schedules. In Schedule A, the epoxy was cured by prebaking for 30 minutes at 120° C. followed by baking for 30 minutes more at 180° C. In Schedule B, the epoxy was also prebaked at 120° C. for 30 minutes but was then further baked for 2 hours at 180° C. In each instance, the curing was conducted in vacuum. The packages (without lids) were then vacuum baked for 90 minutes at 200° C. The vacuum was released under dry nitrogen and the lid was welded onto the package in a nitrogen atmosphere. Drying was completed by heating the sealed package for 24 hours at 150° C.

The moisture levels within the header packages were monitored over a period of 6 weeks at two test temperatures, 150° C. and 250° C. The results are summarized in Table II below:

TABLE II
MOISTURE LEVELS WITHIN HERMETICALLY SEALED HEADER PACKAGES EMPLOYING MOISTURE-ABSORBING EPOXY COMPOSITIONS

| Conditions and Time Period Monitored | Moisture (ppm) | |
|---|---|---|
| | Cure Schedule A | Cure Schedule B |
| Post Seal | 632 | 460 |
| 150° C./1 day | 198 | 591 |
| 150° C./7 days | 233 | 267 |
| 150° C./21 days | 299 | 271 |
| 150° C./42 days | 519 | 512 |
| 250° C./7 days | 377 | 202 |
| 250° C./42 days | 734 | 260 |

The results in Table II show that longer curing schedules appear to have little advantage when the epoxy compositions are stored at temperatures up to 150° C. However, in higher temperature environments (i.e. 250° C.) a longer cure schedule appears to be preferred. In all instances the moisture levels detected with the epoxy compositions of the present invention were well below the limits set by industrial and military standards.

The composition of Example II also was tested in a hermetically sealed "sidebraze" package process. Semiconductor circuit dice were bonded into the packages with the conductive moisture-absorbing epoxy using a cure schedule of 120° C. for 30 minutes followed by 180° C. for two hours. Curing was conducted with and without a vacuum in separate experiments. The package was sealed by brazing a metallic gasket material between the lid and package in a conveyorized sealing oven blanketed with dry nitrogen. Peak temperature exposure was 315° C. for three to four minutes. Oven dwell time was approximately twenty-three minutes.

To determine how well the epoxy composition absorbed any retained moisture, sidebraze package outgassing of moisture was determined. Outgassing of moisture immediately after sealing was measured at about 1440 ppm for packages containing dice cured under vacuum and 2171 ppm for packages where the die adhesive was cured without a vacuum. After twenty-four hours, moisture outgassing for the vacuum-cured die packages dropped to 558 ppm and for the non-vacuum cured adhesives dropped to 774 ppm.

Having described various embodiments of the invention, modifications, additions and substractions will be apparent and are intended to be covered by the following claims.

I claim:

1. A method for absorbing moisture within a moisture-sealed enclosure surrounding an article, the method comprising the steps of
   A. mixing a curable epoxy resin with a quantity of an independent curing agent sufficient for curing said resin and an effective amount of an anhydride of a monocarboxylic acid for absorbing moisture,
   B. applying said mixture of said resin, curing agent and anhydride to said article, and
   C. sealing the enclosure to exclude moisture from entering therein.

2. The method of claim 1 wherein the epoxy resin is a resin chosen from the group of ethers of polyhydroxyphenols, ethers of polyalcohols and epoxylated cyclic and straight-chain olefins.

3. The method of claim 1 wherein the anhydride is chosen from the group consisting of aliphatic carboxylic acids and substituted derivatives thereof.

4. The method of claim 3 wherein the anhydride is chosen from the group of formic, acetic, propionic, butyric, and valeric acid anhydrides and substituted derivatives thereof.

5. The method of claim 4 wherein the anhydride is a substituted derivative chosen from the group of chloro, methyl and cyano-derivatives.

6. The method of claim 1 wherein the curing agent is an agent chosen from the group of primary and secondary aliphatic polyamines, metal halides, organo-metallic halide complexes, phosphoric acid and partial esters thereof, diazonium salts, amino compounds and salts of inorganic acids.

7. A method for packaging electronic devices in substantially moisture-free packages, the method comprising the steps of
   A. securing the device within the package with a moisture-absorbing epoxy composition comprising a curable epoxy resin, an independent curing agent and an effective amount of an anhydride of a monocarboxylic acid, for absorbing moisture, and
   B. sealing the package to exclude moisture from entering therein.

8. The method of claim 7 wherein the epoxy resin is chosen from the group of ethers of polyhydroxyphenols, ethers of polyalcohols, epoxylated cyclic and straight-line olefins.

9. The method of claim 7 wherein the anhydride is an anhydride of a carboxylic acid chosen from the group of aliphatic carboxylic acids and substituted derivatives thereof.

10. The method of claim 9 wherein the anhydride is further defined as chosen from the group of formic, acetic, propionic, butyric, and valeric acid anhydrides and substituted derivatives thereof.

11. The method of claim 10 wherein the anhydride is an acetic acid anhydride.

12. The method of claim 10 wherein the anhydride is a propionic acid anhydride.

13. The method of claim 10 wherein the anhydride is a butyric acid anhydride.

14. The method of claim 10 wherein the anhydride is a valeric acid anhydride.

15. The method of claim 7 wherein the curing agent comprises an agent chosen from the group of primary and secondary aliphatic polyamines, metal halides, organo-metallic complxes, phosphoric acid and partial esters thereof, diazonium salts, amino compounds and salts of inorganic acides.

16. The method of claim 15 wherein the curing agent is boron trifluoride monoethylamine.

17. A moisture-absorbing composition comprising
   A. a curable epoxy resin,
   B. a quantity of an independent curing agent sufficient for curing said epoxy resin, and
   C. an effective quantity of an anhydride of a monocarboxylic acid for absorbing moisture.

18. The composition of claim 17 wherein the epoxy resin is chosen from the group of ethers of polyhydroxyphenols, ethers of polyalcohols and epoxylated cyclic and straight-chain olefins, the curing agent chosen from the group of primary and secondary aliphatic polyamines, metal halides, organo-metallic halide complexes, phosphoric acid and partial esters thereof, diazonium salts, amino compounds and salts of inorganic acids, and the moisture absorbing anhydride is chosen from the group of formic, acetic, propionic, butyric, and benzoic acid anhydrides and substituted derivatives thereof.

19. The composition of claim 18 wherein the anhydride is an acetic acid anhydride.

20. The composition of claim 18 wherein the anhydride is a propionic acid anhydride.

21. The composition of claim 18 wherein the anhydride is a butyric acid anhydride.

22. The composition of claim 18 wherein the curing agent is boron trifluoride monoethylamine.

* * * * *